United States Patent [19]

Wulfers

[11] 4,306,409
[45] Dec. 22, 1981

[54] MULCHING GRID

[76] Inventor: William E. Wulfers, 16 Amy Todt Dr., Monroe, N.Y. 10950

[21] Appl. No.: 91,259

[22] Filed: Nov. 5, 1979

[51] Int. Cl.³ .................. A01D 53/08; A01D 55/18
[52] U.S. Cl. .................................. 56/320.2; 56/17.4; 56/255
[58] Field of Search ............... 56/17.4, 255, 320.2

[56] References Cited

U.S. PATENT DOCUMENTS

| | | | |
|---|---|---|---|
| 2,692,466 | 10/1954 | Brunts et al. | 56/320.1 |
| 2,802,327 | 8/1957 | Thelander | 56/17.4 |
| 3,043,077 | 7/1962 | Novak | 56/320.2 |
| 3,369,350 | 2/1968 | Rogers et al. | 56/11.9 |
| 3,385,041 | 5/1968 | Douglas | 56/255 |
| 3,423,918 | 1/1969 | Siwek | 56/17.4 |
| 3,531,922 | 10/1970 | Hansen | 56/255 |
| 3,577,871 | 5/1971 | Engler | 56/255 |
| 3,905,181 | 9/1975 | Messnier | 56/320.2 |
| 4,135,351 | 1/1979 | Akgulian | 56/255 |

Primary Examiner—Paul J. Hirsch

[57] ABSTRACT

A device for the comminution of leaves for the preparation of fine particles for a mulch useful with a leaf comminuting apparatus having an opening for the escape of comminuted materials, comprises a comminuting grid adapted to be disposed over the opening for further comminuting said leaves, said grid comprising a plurality of vertically suspended chain elements in lateral contact with each other. The grid includes a generally rectangular support plate defining a plurality of slots, and the chain elements are mounted on a support plate with their uppermost links extending through the slots. An elongated rod passes through the uppermost links and is adapted at one end thereof to nest within an opening provided in the support plate. The chain elements provide a simple expedient for the fine comminution of leaf matter which is durable in use. The present device is also self-cleaning, as the contiguous chain elements serve to remove accumulated leaf matter from each other during use.

7 Claims, 4 Drawing Figures

MULCHING GRID

BACKGROUND OF THE INVENTION

This invention relates generally to comminuting devices, and more particularly to devices for comminuting organic matter including vegetation such as leaves. This invention relates specifically to devices useful in mulching leaves.

In most of the areas of the world where deciduous trees grow, it is a common practice among the owners of the tree-bearing land, particularly in residential areas, to remove fallen leaves from the landscape. This process is time consuming and often arduous, particularly in the instance where the person engaging in the removal of the leaves is of advanced age.

Recently, a variety of devices have been developed which employ some motive means for picking up and retaining a quantity of the leaves in a storage sack attached to the machine. This process, while superior to manual leaf removal by raking or the like, does not address the problem of removing the leaves from the premises. Thus, large sacks of leaves must be assembled, sealed and physically carried off the premises.

It is also well known that the organic matter constituting the leaves provides an excellent fertilizing medium, if properly fermented or decayed. In this connection, it has been common practice to place organic matter such as leaves and the like in a hole in the ground, known as a compost pile, to permit fermentation to occur over an extended period of time. An alternate approach has been to comminute the leaves into a fine particulate consistency, to form a "mulch" thereof which may then be evenly spread like granular fertilizer over the surface of the lawn, at the base of shrubbery, as well as being incorporated into tracts of land used for growing annual crops. A further utility for the "mulch" comprises the placement thereof into the aforementioned compost pile to allow fermentation to occur, after which the fermented mulch may be employed as formerly suggested in the manner of an organic fertilizer.

Devices for comminuting material such as organic matter are also known. A conventional lawn mower can be employed to comminute leaves while retrieving them from the ground. This is particularly so in view of the present rotary-type mowers which employ collector sacks associated with the cutting outlets on the mower housing.

One difficulty that has attended the employment of lawn mowers as leaf mulchers, has been the inability to control the consistency and direction of the leaves during the comminuting process, and to prevent frequent breakdown of the process due to clogging of the devices. Thus, lawn mowers have conventionally been provided with gratings defining a plurality of smaller holes, which are then installed over the large grass outlets to assist in the mulching operation. These devices have the shortcoming that the particles are insufficiently comminuted, and frequently clog the openings in the grate, with the result that the grate must be frequently cleaned during use.

Certain prior art devices relating generally to the area of the present invention are known which are believed pertinent. Thus, U.S. Pat. No. 2,692,466 to Brunts et al relates to a disc type lawn mower which employs a plurality of chains depending from the rear edge of the lawn mower at spaced apart intervals to prevent objects placed in motion during the operation of the lawn mower from escaping the lawn mower housing and injuring the operator. Likewise, U.S. Pat. No. 3,369,350 to Rogers et al relating to a shredder implement, employs a plurality of chain members again disposed in spaced apart relationship to each other which serve to prevent material being shredded from being thrown forward of the shredding device. None of the foregoing references appreciates the utility or specific construction of the present device.

SUMMARY OF THE INVENTION

In accordance with the present invention, a device is disclosed which is useful in combination with a leaf comminuting apparatus such as a lawn mower, which comprises a plurality of vertically suspended chain elements disposed in a linear arrangement and in lateral contact with each other. A support means for the chain elements, comprising a generally planar support plate is adapted for attachment to the comminuting apparatus vertically above the escape chute or opening thereof, and defines along its greatest longitudinal dimension a plurality of linearly aligned openings adapted to receive and pivotally retain the uppermost links of said chain elements. Each of said chain elements is disposed in a corresponding opening with its uppermost link protruding vertically upward therefrom, and a linear rod is disposed and passes through the upwardly protruding portion of said link. The rod is adapted at one end thereof for securement within the plate.

In a preferred embodiment, the chain elements are disposed in parallel vertical planes which reside at a skew angle with respect to a single vertical plane containing all of said chain elements.

The contiguity of the respective chain elements, and their pivoting motion in operation results in a finer comminution of the leaf matter. The frequent and bothersome unclogging of the grid is eliminated, as the pivoting chains strike each other in operation and shake loose any agglomerated leaf matter that would clog or otherwise diminish the capability of the grid.

Accordingly, it is the principal object of the present invention to provide a device useful in comminuting or mulching leaves which is inexpensively manufactured and easily employed.

It is a further object of the present invention to provide a comminuting device as aforesaid which improves the uniformity and refines the particle size of the leaf matter in comminution.

It is a yet further object of the present invention to provide comminuting device as aforesaid which is self-cleaning in operation.

Other objects and advantages will be apparent to those skilled in the art from a review of the ensuing description which proceeds with reference to the following drawings.

BRIEF DESCRIPTION

Figure 1:
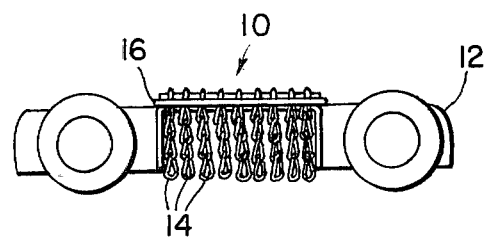
FIG. 1 is a side elevational view illustrating the present invention installed on a lawn mower, only a portion of the mower being shown.

The present invention comprises a grid useful in assisting the comminution of vegetable matter such as leaves. Referring to FIG. 1, the grid of the present invention, generally designated 10, is shown mounted on the escape chute of a lawn mower referred to herein as 12. Lawn mower 12 is structurally typical of the apparatus contemplated by the present invention as it includes a comminuting chamber for the retention of the leaf matter, a shredding means comprising the rotating mower blade and associated power drive for accomplishing the shredding or comminuting process within the chamber, and an opening for the escape of the comminuted matter upon completion of the process.

As noted above, devices, including lawn mowers such as illustrated herein, have been used to attempt to mulch leaf matter. Some of the difficulties with these devices were the nonuniformity and large particle size of the comminuted material in addition to which many leaves were left uncomminuted. Attempts to remedy this difficulty comprised the placement of a screen or grid element over the escape opening of the comminuting apparatus. This grid, however, tended to clog in use, as the comminuted material tended to agglomerate thereon and to block the openings of the grid. Thus, the apparatus had to be stopped frequently during operation, and the grid had to be removed and cleaned to enable the comminuting process to continue.

The present device realizes a distinct advantage in its construction and operation over those previously employed. Specifically, grid 10 comprises a plurality of chain elements 14 which are vertically suspended in side-by-side lateral contact with each other, and are adapted to abrade against each other during the operation of an apparatus such as mower 12. This abrasive interaction continually and automatically removes any leaf matter that may adhere to the chain elements, and prevents the accumulation of leaf matter and the obstruction of the openings defined by the chain elements. Further, the proximity of the chain elements 14 with respect to each other provides a uniform, foraminous wall which prevents undesirably large-sized leaf matter from escaping the comminuting apparatus, so that the particle size of the leaf matter passing through grid 10 maintains its uniformity.

Figure 2:
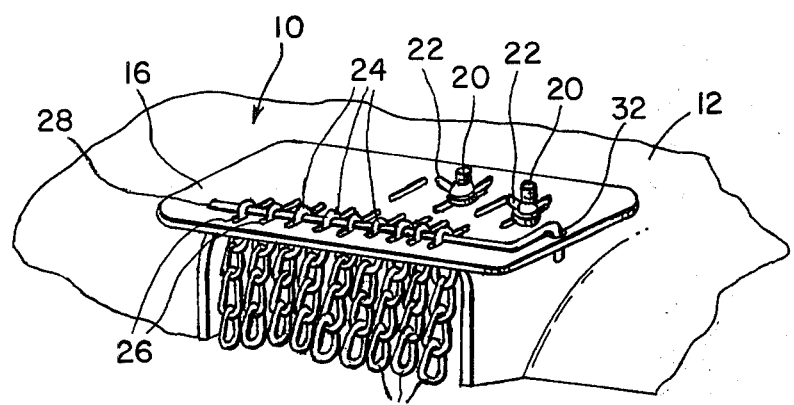
FIG. 2 is a partial perspective view of the invention of FIG. 1.

Referring now to FIGS. 1 and 2, grid 10 further comprises a planar support plate 16 which is adapted for attachment to the comminuting apparatus vertically above the escape opening 18 defined therein. In a preferred embodiment, support plate 16 may define a generally rectangular perimeter having a longitudinal dimension larger than that of escape opening 18, so as to provide complete coverage thereof. Support plate 16 may be attached to the comminuting apparatus in a variety of ways, and in a preferred embodiment, may be detachably mounted by means of mating bolts 20 and nuts 22, illustrated herein as wing nuts. A preferred means of attachment will be discussed infra with reference to FIG. 4.

Figure 3:
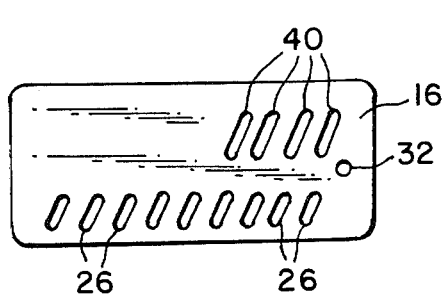
FIG. 3 is a top plan view illustrating the support plate of the present invention.

Referring further to FIG. 2, chain elements 14 are detachably retained and adapted for pivotal movement within support plate 16 by a mounting means comprising a plurality of orifices 26, shown more clearly and in a preferred embodiment in FIG. 3. Chain elements 14 are comprised of conventional link chains which are disposed within support plate 16 with their uppermost links 24 protruding through orifices 26 as illustrated. A rod 28 is then placed through the openings defined between the protruding links 24 and the adjacent surface of support plate 16, as clearly shown in FIG. 2. Rod 28 thus retains chain elements 14 in vertical pivotal suspension over the escape opening 18 of mower 12. A locking means is provided to retain rod 28 in position as shown, and comprises a hook shaped member 30 defined at one end of rod 28, which is adapted to be received within a mating opening 32 provided in support plate 16. Rod 28 is thus prevented from sliding laterally out of contact with chain elements 14 during the operation of the comminuting apparatus. Though the hook shaped member or hooked member 30 is shown as having a generally L-shaped, it is to be understood that any comparable shape can be employed, so long as the hook member is capable of nesting within opening 32 during the operation of the comminuting apparatus and the installation of the present grid.

A preferred embodiment of the present invention is illustrated more clearly in FIG. 3 wherein support plate 16 is seen to drfine a plurality of orifices 26 which comprise elongated slots. The slots are disposed in parallel relationship in each other and are situated in parallel planes transverse to the plane containing the chain elements 14. The provision of orifices 26 in the shape of slots limits the upward travel of the uppermost chain links and thereby further assures the secure engagement of chain elements 14 by rod 28. In a particular embodiment of the present invention, orifices 26 as shown in FIG. 3 may be disposed at a predetermined angle with respect to the longitudinal perimeter of support plate 16. This angular disposition places the chain elements 14 in a particular orientation with respect to each other which is believed to be beneficial to the interaction of the chain elements during the operation of the grid.

A preferred type of chain comprises machine-twist links which permit the adjacent chain lengths to hang in very close proximity to each other, nesting one against another, whereupon improved self cleaning action can be obtained. In this preferred embodiment where machine twist links comprise the chain lengths, the upper portion of each link tends to ride upwardly on the next higher link with a twisting motion as the comminuting apparatus vibrates. This action enhances the self-cleaning action of the adjacent, touching chain lengths. In addition, the use of this type of chain provides more uniformly sized apertures through which the leaf pieces are thrown.

The above described embodiment, although preferred, is but one of several that are broadly encompassed by the present invention, and the invention is accordingly not limited to the illustrations herein.

Figure 4:
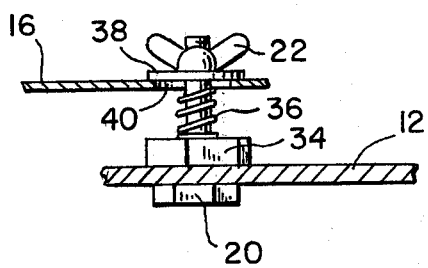
FIG. 4 is a side sectional fragmentary view illustrating the mounting means of the present invention.

Referring now to FIG. 4, a means is shown for the disengagable mounting of support plate 16 on the surface of the comminuting apparatus comprising mower 12 in the illustrations herein. As noted earlier, appropriate holes can be provided to mate with each other in axial alignment so that bolt 20 and corresponding nut 22 can be placed therethrough and fastened. In a preferred embodiment in accordance with the present invention and as illustrated in FIG. 4, bolt 20 is provided with resilient adapter means comprising an adjustable lock nut 34 which is adapted to secure bolt 20 in fixed relation to the surface of mower 12. Though the illustration suggests that lock nut 34 resides in contact with the surface of mower 12, it is contemplated that lock nut 34 is disposed in slightly spaced apart relation with respect to the surface of mower 12, and in particular, at a space of approximately 1/16 inch. Bolt 20 is thereby permitted to oxcillate slightly in the opening provided through the surface of mower 12 to accommodate variations in the curvature of the mower during the installation of the support plate 16. Further in this regard, a resilient spring means 36 is disposed between lock nut 34 and support plate 16. Spring means 36 serves to maintain support plate 16 in spaced apart relation to the surface of the apparatus comprising mower 12, so that, again, variations in the curvature of the mower at the point of attachment can be accommodated, and the vibration of the plate 16 accentuated. In the illustration in FIG. 4, a conventional washer 38 is disposed below nut 22 shown herein to be a wing nut. Washer 38 provides for the securement of wing nut 22 in the instance where, as illustrated herein, the openings provided in support plate 16 are of the elongated adjustable type as shown generally at 40, to accommodate variations in the disposition of mating openings in the mower 12.

The resilient mounting means illustrated in FIG. 4 is specifically useful in the instance where the present grid is to be mounted on the housing of a lawn mower such as that illustrated, as the opening 18 is conventionally provided at the end of a discharge chute which may frequently have a curved top. The present preferred means for mounting the grid 10 on the mower 12 renders the present invention adaptable to an endless variety of installations on mowers and the like having divergent outer housing configurations.

Further with respect to FIG. 4, spring means 36 has been illustrated, but it is contemplated that other resilient means may be employed in place thereof such as a sponge or foam segment having an appropriate bore, not illustrated herein. The present invention, therefore, is deemed to encompass all such variations in the spring means within its spirit and scope.

The grid of the present invention may be easily and inexpensively manufactured from a wide variety of generally available materials which possess the suitable strength and durability for the applications and utilities contemplated herein. In particular, the support plate may be prepared from a variety of metals such as aluminum alloys, steel and the like, and the chain elements may likewise be selected from those presently prepared from materials such as copper alloys, aluminum, and various steels. The invention is naturally not limited to the selection of any particular material, but rather encompasses all such material having suitability for particular purposes within its scope. Steel however is a preferred material since it has adequate strength and is, in addition, relatively heavy whereby improved self-cleaning action is acheived.

In operation, grid 10 is first mounted on mower 12 by the securement of bolts 22 and lock nuts 34 in position as shown in FIG. 4. Thereafter, spring means 36 are placed over bolts 20 and support plate 16 is placed thereover. Thereafter, washers 38 and wing nuts 22 are applied to place support plate 16 in tensioned engagement against spring means 36. Prior to mounting support plate 16 on mower 12, chain elements 14 have been located with their uppermost links 24 protruding upwardly through orifices 26, and rod 28 has been inserted to pass through the spaces defined thereby in the direction of right to left as viewed in FIGS. 1 and 2. Naturally, the present invention is not limited to the provisions of rod 28 with hook member 30 on the right hand side, but could be prepared with hook member 30 located on the opposite side thereof, in which case the foregoing instructions could be modified accordingly. It is desirable to provide the hook member 30 at the front end of the mower so that, if disengaged, the hook will prevent the rod 28 from passing backwards through the chains.

After rod 28 is inserted as described above, it is rotated in the direction urging hook member 30 into seated engagement with opening 32. This procedure locks rod 28 in position, and grid 10 is now ready for installation on mower 12. The entire unit is reversible and can be used on the left or right side of a mower.

Once mounted upon mower 12 and in use, grid 10 may, if desired, be disassembled by reversing the steps related with respect to the mounting of chain elements 14 within support plate 16, while retaining support plate 16 in position on the mower, although it is normally unnecessary to do so because the plate can be removed with the chains. The simplicity of assembly and disassembly of the present grid renders endless variation possible, and further description thereof is not believed necessary herein.

Although the foregoing description has proceeded with reference to the employment of the present grid on the lawn mower, it is to be understood that the grid may be employed with any comminuting device comprising a comminuting chamber, a comminuting means disposed in the chamber, and an opening provided in the chamber for the escape of the material upon the completion of comminution.

The present device is inexpensively manufactured, as it may be fabricated from materials generally commercially available and is extremely durable by virtue of the construction of those materails. Leaf matter and other matter comminuted is uniformly reduced in size, and interim maintenance of the grid is virtually eliminated due to the abrasive action that occurs between the contiguous chain elements.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. A grid for comminuting vegetable matter such as leaves, for use with a comminuting apparatus comprising a comminuting chamber having shredding means located therein, and an opening in said chamber toward the escape of comminuted matter therefrom, said comminuting grid comprising:

a generally planar support plate adapted to be mounted vertically above said opening, a plurality of chain elements vertically suspended from said support plate in side-by-side linearly aligned vertical contact with each other, and mounting means for the detachable pivotal attachment of said chain elements to said support plate, wherein said chain elements define a continuous, foraminous wall which prevents insufficiently comminuted material from escaping from said comminuting apparatus, and said chain elements abrade against each other to prevent the comminuted matter from agglomerating thereon, and further including means for disengagably mounting said support plate on said comminuting apparatus, comprising at least two bolts and mating nuts adapted to pass through axially aligned holes provided in said comminuting apparatus and said grid, wherein said bolts further comprise adjustable resilient lock nuts adapted to secure said bolts adjacent said comminuting apparatus for protrusion outward therefrom, and resilient spring means disposed between said resilient lock nut and said support plate, whereby said support plate is adapted to accommodate variations in the shape of said comminuting apparatus, and permitted to oscillate in relation to said comminuting apparatus to further enhance the movement of said chain elements during the operation of said apparatus.

2. The grid of claim 1 wherein said mounting means further comprises a linearly elongated rod adapted to pass through the portions of said chain elements partially protruding above said support plate.

3. The grid of claim 2 wherein said orifices are elongated slots disposed with their longitudinal dimensions parallel to each other, said chain elements comprise individual lengths of chain links, the end-most links of one end of said chain elements are disposed to protrude through and above said slots, and said rod is adapted to pass through the spaces defined between said support plate and the protruding portions of said end-most links.

4. The grid of claim 2 further including locking means for detachably securing said rod in position along said support plate.

5. The grid of claim 4 wherein said locking means comprises a transversely extending hook member, defined at one end of said rod and a mating hole defined in said support plate for the reception of said hook member when said rod is disposed in retaining relationship with said support plate and said chain elements.

6. The grid according to claim 2 wherein said support plate defines a generally rectangular perimeter.

7. The grid of claim 6 wherein said orifices are disposed in linear alignment running parallel to the longitudinal portion of said perimeter.

* * * * *